United States Patent [19]
Creswick et al.

[11] Patent Number: 6,116,366
[45] Date of Patent: Sep. 12, 2000

[54] TRUCK BUTTERFLY HOOD MOUNT SYSTEM

[75] Inventors: Graham E. Creswick; Adrian J. Tedder, both of Chatham, Canada

[73] Assignee: Navistar International Transportation Corp., Chicago, Ill.

[21] Appl. No.: 09/135,451

[22] Filed: Aug. 17, 1998

[51] Int. Cl.[7] .................................................. B62D 25/10
[52] U.S. Cl. ............................................................ 180/69.2
[58] Field of Search .............................. 180/69.2, 69.21, 180/69.22, 69.23, 69.24

[56] References Cited

U.S. PATENT DOCUMENTS

| | | | |
|---|---|---|---|
| 1,155,321 | 9/1915 | Futterman | 180/69.2 |
| 1,198,189 | 9/1916 | Chop | 180/65.2 |
| 1,344,095 | 6/1920 | Skala | 180/69.2 |
| 1,346,325 | 7/1920 | McKinley | 180/65.2 |
| 1,365,121 | 1/1921 | Norvell | 180/69.2 |
| 1,609,554 | 12/1926 | Knapp | 180/65.2 |
| 1,830,733 | 11/1931 | Boca | 180/65.2 |
| 5,553,911 | 9/1996 | Bodin et al. | |

Primary Examiner—Michael Mar
Attorney, Agent, or Firm—Jeffrey P. Calfa; Neil T. Powell; Dennis Kelly Sullivan

[57] ABSTRACT

A butterfly hood mount system for a truck vehicle with a cab air suspension system. More specifically, the butterfly hood mount system is comprised of a four paneled butterfly hood with a center hinge rod fixed against fore-and-aft movement to a chassis component of the vehicle in the front and in the rear fixed against lateral or side to side movement of the cab of the vehicle, but capable of fore-and-aft movement relative to the cab of the vehicle.

18 Claims, 7 Drawing Sheets

TRUCK BUTTERFLY HOOD MOUNT SYSTEM

BACKGROUND OF THE INVENTION

This invention relates to a truck vehicle butterfly hood mount system and a vehicle with a butterfly hood mount system installed. Butterfly hoods on vehicles consist of two or more panels which are hinged in the center. The truck vehicle butterfly hood mount system of this invention consists of a four-paneled butterfly hood for mounting on a vehicle. The vehicle has a cab for a driver and passengers which has air suspension to improve the comfort of the driver and passengers. The butterfly hood is fixed to a chassis component at a forward position to inhibit fore-and-aft movement of the hood. The butterfly hood is laterally but not fore-and-aft fixed to a cab component at a rear mounting position.

PRIOR ART

Truck vehicles have long had butterfly or center pivoting hoods to allow engine access. The term butterfly refers to the appearance of the hood when it is open as it is made of multiple panels that flip over and when viewed from the front of the vehicle give a butterfly like appearance. These prior art butterfly hoods are typically used on truck vehicles when the vehicle will be used with front mounted equipment, such as a snow plow attachment. The snow plow or other front mounted equipment would preclude access to the vehicle engine if a more common tilt hood was used.

Truck vehicles have had cabs with air suspension relative to the chassis in the past. An example of such an air suspended cab is shown in U.S. Pat. No. 5,553,911. The cab air suspension allows the cab to move fore-and-aft, as well as side to side relative to the chassis. Cab air suspensions afford a smoother and more comfortable ride to driver and passengers.

Prior art truck vehicles with butterfly hoods did not have cabs with air suspension. In the prior art, the butterfly hoods pivoted upon its center hinge rod that ran between the panels on the right and two panels on the left. The center hinge rod was supported laterally in the front and in the rear by identical retainer blocks. The retainer block on the rear was mounted on the cowl of the cab, and the retainer block in the front was mounted on the radiator shell which was fixed to the vehicle chassis. Stay rods were mounted between the cowl and the radiator shell. When the butterfly hood was closed, the top panels of the butterfly hood rested on extruded rubber strips around the cowl of the cab and around the radiator shell flange. The stay rods were engaged in the front at the radiator to fixed radiator brackets, and in the rear the stay rods were engaged to fixed cowl brackets of the cowl. The stay rods prevented relative fore-and-aft movement between the cowl and the radiator. This was to prevent the butterfly hood from falling into the engine compartment, should the cab move fore-and-aft relative to the chassis. These fixed connections between the chassis and the cab prevented the fore-and-aft cab movement required of cab air suspension systems. As a result, drivers of vehicles with butterfly hoods could not enjoy the benefits of cab air suspension system.

To date, a truck vehicle with a butterfly hood and a cab air suspension has not been suggested.

SUMMARY OF INVENTION

As a result, a primary object of this invention is to provide a truck butterfly hood mount system for a vehicle with a cab air suspension system. The primary object of the invention is accomplished by having a four-paneled butterfly hood with a center hinge rod for a vehicle with cab air suspension. The butterfly hood center hinge rod is fixed to a chassis component such as a radiator at a front mounting position. The front mounting position allows pivoting of the hood at the front position to allow opening and closing. As a result, the butterfly hood will move fore-and-aft with the radiator. The butterfly hood center hinge rod is fixed against lateral move at a rear mounting position but allows fore-and-aft move movement of the cab component as well as pivoting of the hood on the center hinge rod.

The cab component for engagement is preferably the cowl. The rear mounting position assembly may have a rubber isolator to compensate for installation variations. The butterfly hood mounting system may also have "V" notch brackets attached to the left and right cowl with the butterfly hood side panels having corresponding mating hood support brackets with wear pads to engage to the "V" shaped brackets to provide vertical support to the butterfly hood side panels.

DRAWINGS

Other objects and advantages of the invention will become more apparent upon perusal of the detailed description thereof and upon inspection of the drawings in which.

DETAILS OF INVENTION

There is shown in FIGS. 1, 5, 6, 7, 8, 9 and 10 a truck vehicle 101 with a butterfly hood mount system 10 installed and made in accordance with this invention. The vehicle 101 has a chassis 102 (not shown) with two approximately parallel frame rails, 103a and 103b (not shown). The vehicle 101 has an engine 104 (not shown) engaged to the chassis 102. A radiator 105 for cooling the engine 104 is engaged to the chassis 102. A cab 106 for driver is engaged to the chassis 102 through a cab air suspension system 110 (not shown). The cab air suspension system 110 allows the cab 106 to move independently of the chassis 102. The vehicle 101 has axle assemblies 107 engaged to the chassis 102 with wheels 108. The engine 104 is engaged to a rear axle assembly 107 through a transmission 111 (not shown) and a drive train 112 (not shown).

Figure 1:
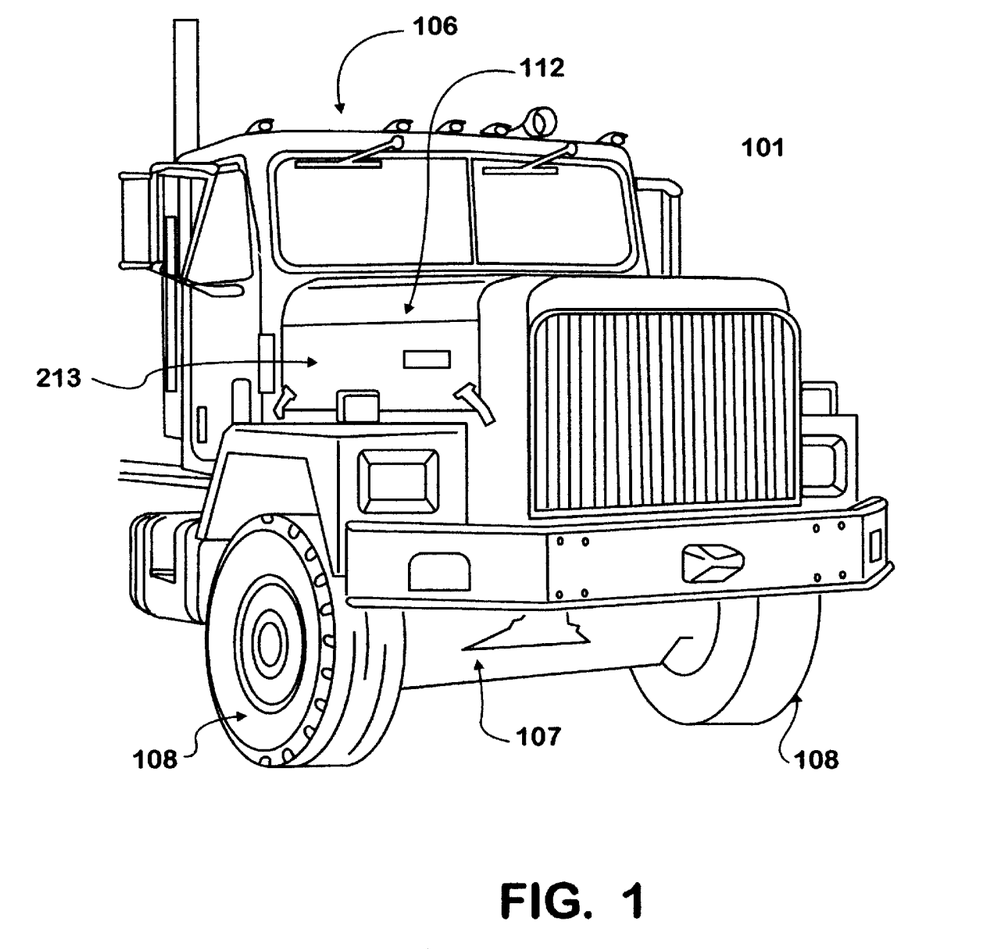
FIG. 1 is perspective view of a vehicle with a four paneled butterfly hood.
Figure 2:
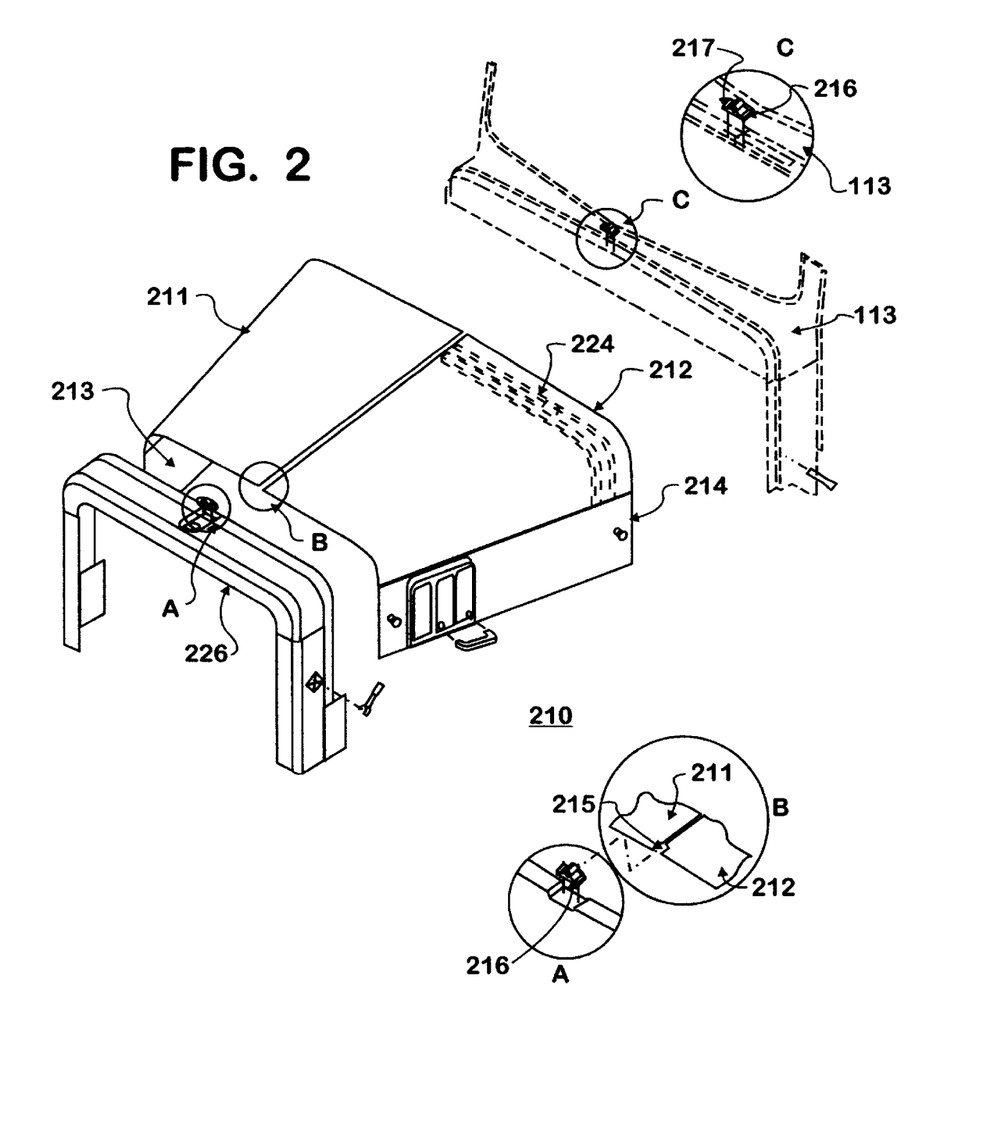
FIG. 2 is a partial assembly view of a prior art butterfly hood.
Figure 3:
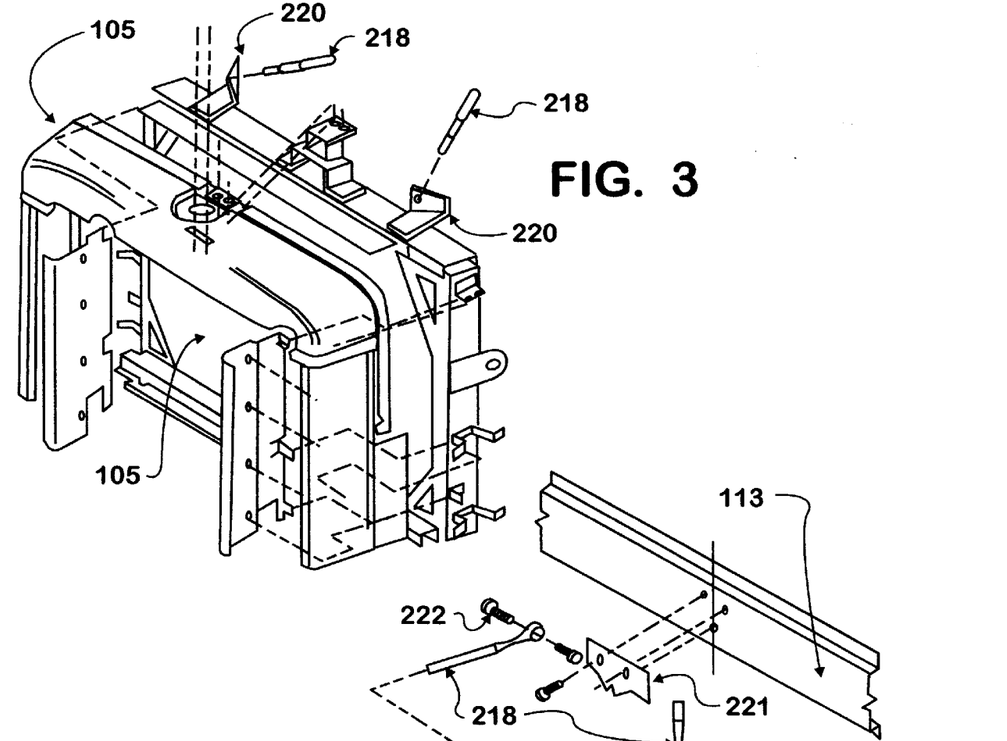
FIG. 3 is a partial assembly view of the front engagement of the prior art hood of FIG. 2.
Figure 4:
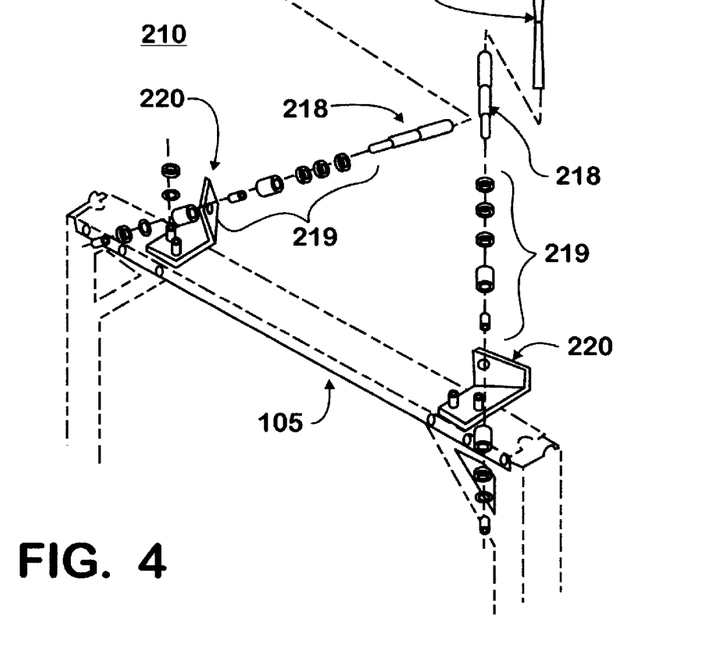
FIG. 4 is a partial assembly view of the rear engagement of the prior art hood of FIG. 2.
Figure 5:
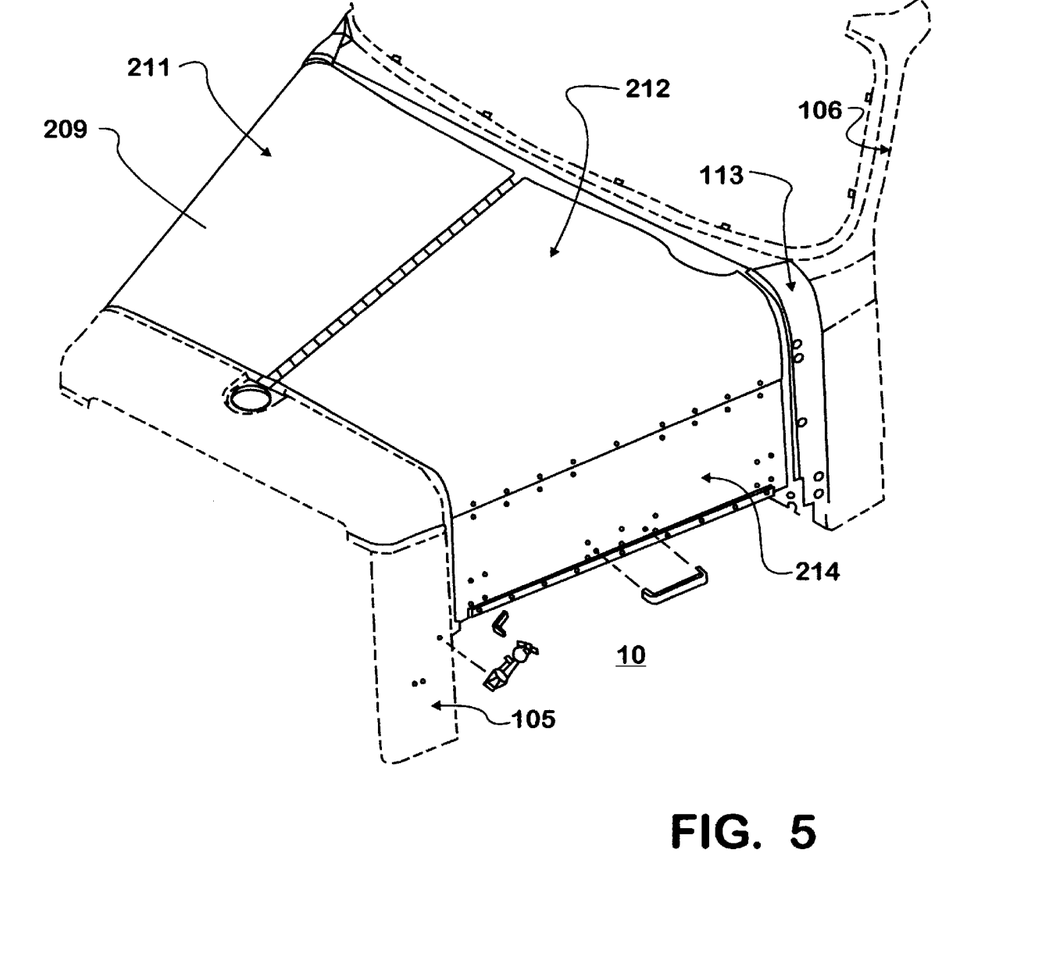
FIG. 5 is a partial assembly view of a butterfly hood mount system made in accordance with this invention.
Figures 6, 7:
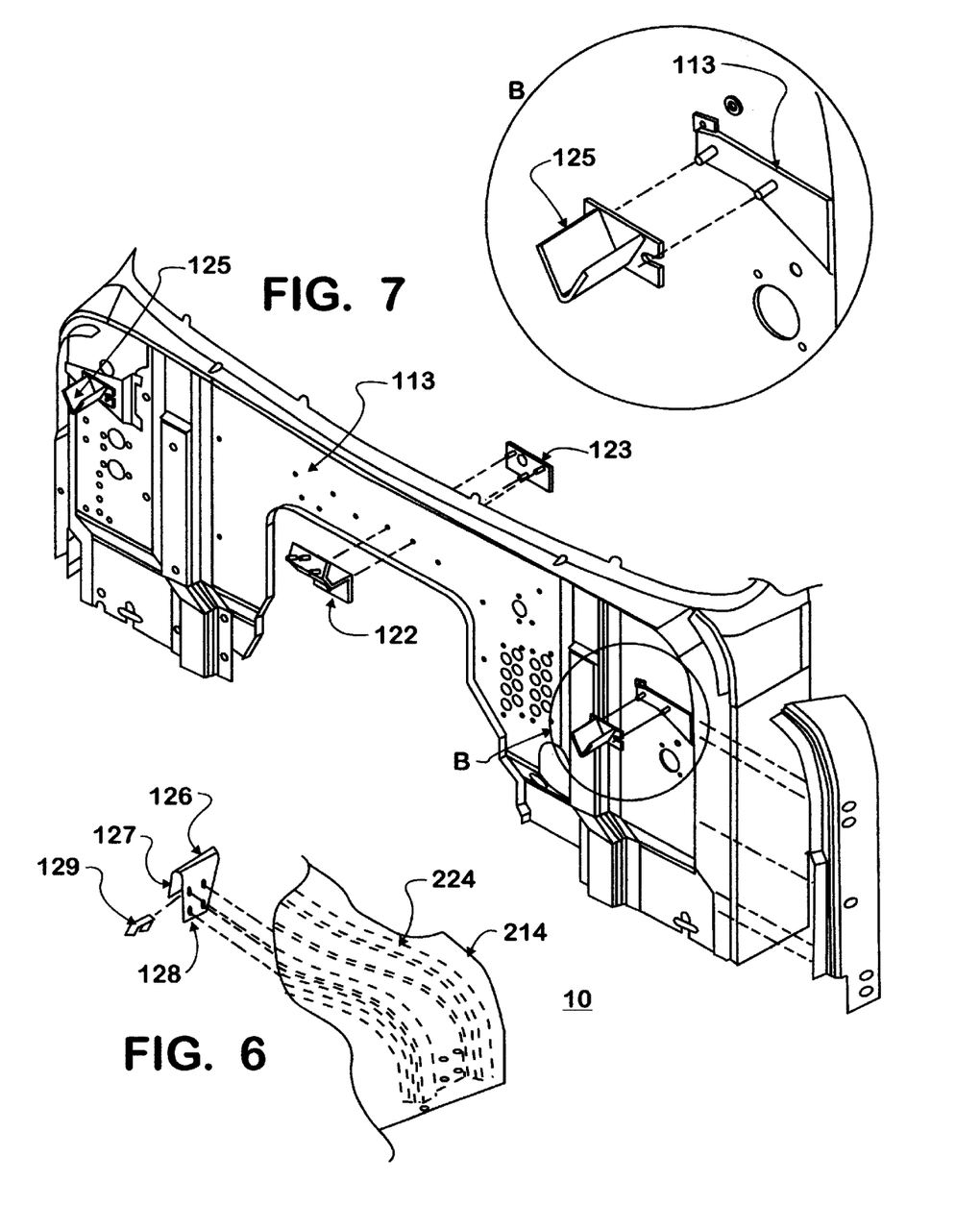
FIG. 6 is a partial assembly view of the rear engagement of the butterfly hood mount system.
FIG. 7 is a blow up view of the "V" brackets shown in FIG. 6.
Figure 8:
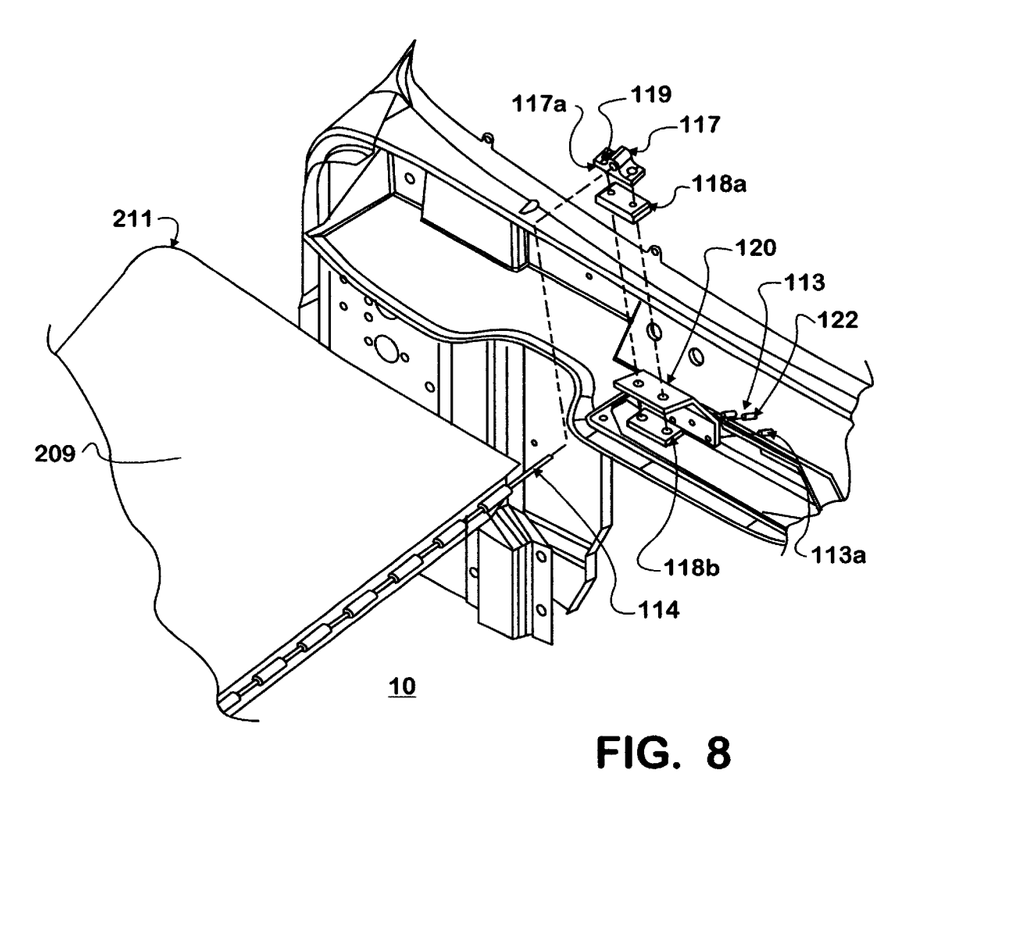
FIG. 8 is a blow up view of the rear mounting position of the butterfly hood mount system of FIG. 5.
Figures 9, 10:
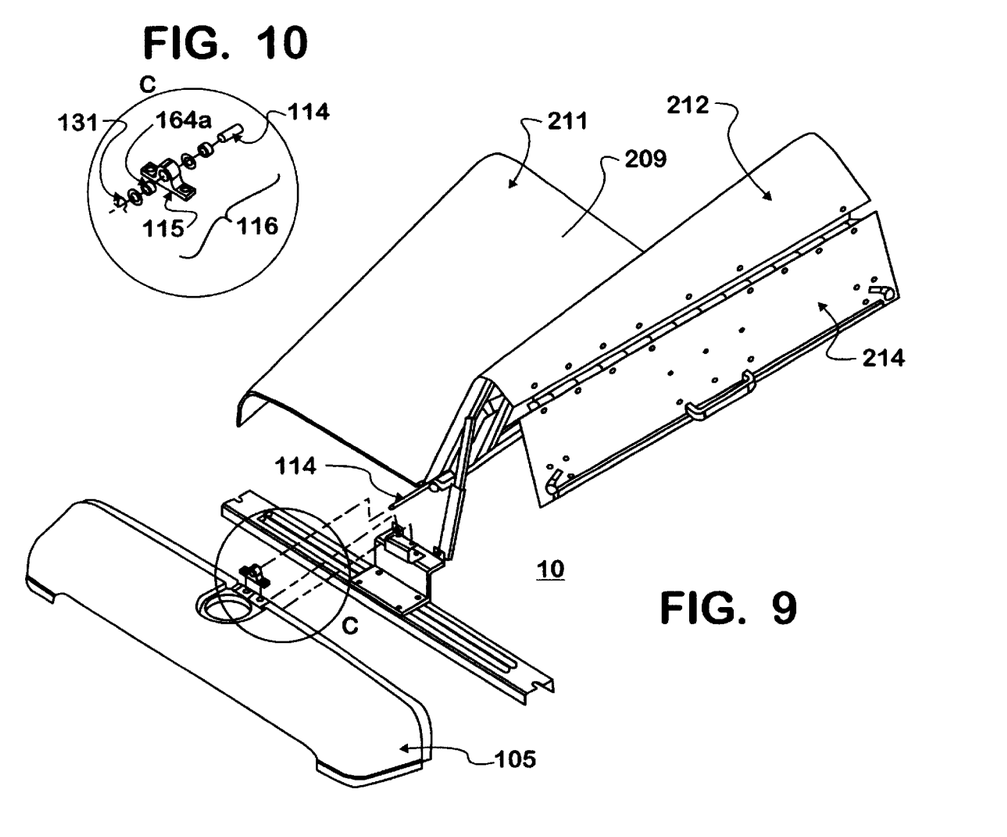
FIG. 9 is a partial assembly view of the front mounting position of the butterfly hood mount system of FIG. 5.
FIG. 10 is a blow up view of the front mounting position shown in FIG. 9.

A prior art butterfly hood mounting 210 is shown in FIGS. 2 to 4. The butterfly hood mounting 210 is generally comprised of a butterfly hood 209 and associated mounting components. The butterfly hood 209 has four main components: a top right panel 211, a top left panel 212, a right side panel 213, and a left side panel 214. A hood hinge rod 215 is engaged between the top right panel 211 and the top left panel 212. The top right panel 211 and top left panel 212 may pivot upwards on the hood hinge rod 215. The hood hinge rod 215 is laterally supported by a retainer 216 installed on a cowl 113 of the cab 106. The retainer 216 that is installed in the cowl 113 is engaged via fasteners 217. An identical retainer 216 is installed on the radiator 105. Vertical support to the top right panel 211 and the top left panel 212 is provided by extruded rubber strips 227 (not shown) around a cowl 226 of the radiator 105. Stay rods 218 are fixed to a top portion of the radiator 105 via fixed radiator brackets 220 through the use of fasteners 219. The stay rods 218 are fixed to the cowl 113 via a common fixed cowl bracket 221 and fasteners 222. The stay rods 218 being fixed between the cowl 113 and the radiator 105 allow no relative movement between the radiator 105 and the cowl 113 of the cab 106. This fixed nature of the stay rods 218 prevents the butterfly hood from falling in upon the engine 104 during periods of flexing of the chassis 102, such as when the vehicle 101 is on a rough road surface. As mentioned previously, this fixing of the cowl 113 of the cab 106 to the radiator 105 of the chassis 102 through the stay rods 218 and prevents the cab 106 from having an air suspension system 110 (not shown). It should be noted that the hood hinge rod 215 is not fixed against fore-and-aft movement within the retainers 216. It is the stay rods 218 that prevent the butterfly hood 209 from falling into and on the engine 104.

There is shown in FIGS. 5 to 10, a butterfly hood mount system 10 made in accordance with this invention. There are no fixed connections between the cowl 113 and the radiator 105 and hence no direct connection between the cab 106 and the chassis 102. The vehicle 101 has a cab air suspension system 110 (not shown). The butterfly hood 209 is comprised of 4 panels: the top right panel 211, the right side panel 213, the top left panel 212 and a left side panel 214. The top right panel 211 and the top left panel 212 are curved at the outer edges to interface downward with the right side panel 213 and left side panel 214, respectively. The right side panel 213 is hinge connected to the right top panel 211. The left side panel 214 is hinge connected to the left top panel 212. A center hinge rod 114 is engaged to allow rotation and hence opening of the butterfly hood 209 between the top right panel 211 and the top left panel 212. Unlike the prior art, the center hinge rod 114 is in fact fixed to a chassis component. The preferred chassis component is the radiator 105. The center hinge rod 114 is engaged to the radiator 105 through a front rod support 115. The front rod support 115 has a front through hole which the center hinge rod 114 passes through and a fastener set 116 is engaged to the center hinge rod 114 to prevent fore-and-aft movement of the center hinge rod 114 relative to the radiator 105. The fastener set 116 may include a snap ring 131 known in the art. Additionally, a spring 116a may be engaged around an outer side of the center hinge rod 114 to allow a very small amount of travel of the center hinge rod 114 relative to the radiator. The spring 116a will allow a small amount of fore-and-aft movement of the butterfly hood 209.

As mentioned earlier, the center hinge rod 114 is not fixed as far as fore-and-aft movement in the rear where it is engaged to the cowl 113. The center hinge rod 114 is, however, fixed against side-to-side and up and down movement. In general, the method of engagement of the center hinge rod 114 in the rear is accomplished by having the center hinge rod 114 slightly elongated compared to the prior art and the length of the center hinge rod 114 which would be needed with no relative movement between the cowl 113 and the cab 106. A hinge rod support 117 is displaced forward relative to the cowl 113 to allow the elongated portion of the center hinge rod 114 to penetrate through the center hole 117a of the hinge rod support 117. This forward displacement allows movement of the center hinge rod 114 without the hood 209 falling upon the engine 104. The center hole 117a may be contained within a brass bushing 117b (not shown) within the hinge rod support 117. The bronze bushing 117b reduces the wear on the center hinge rod 114 during the fore and aft movement which occurs when the cab suspension system 110 (not shown) allows the cab 106 to move. The hinge rod support 117 is engaged to a support bracket 120. There is first rubber isolator 118a between the hinge rod support 117 and the support bracket 120. Additionally there is a second rubber isolator 118b on the side of the support bracket 120 opposite the hinge rod support 117. Fasteners 119 hold the hinge rod support 117, the first isolator 118a, the support bracket 120 and the second isolator 118b together. The support bracket 120 is further engaged to the cowl 113 via a front cowl support 122, and the back cowl support 123 and cowl fastener 113a. The arrangement of the support bracket 120 and the hinge rod support 117 relative to the cowl 113 allow for the elongated portion of the center hinge rod 114 to move fore-and-aft relative to the cowl 113 in an independent fashion. The fact that the center hinge rod 114 is elongated in this rearward direction and that the hinge rod support 117 is displaced forward allows relative movement of the butterfly hood 209 in regards to the cowl 113 and hence the cab 106. When the cab air suspension system 110 causes fore-and-aft movement of the cab 106 in this way, the butterfly hood 209 is prevented from slipping out of its rear engagement and falling in upon the engine 104. The hinge rod support 117 does provide lateral support, that is side-to-side movement of the center hinge rod 114. Additionally, the hinge rod support 117 prevents up and down, vertical movement of the center hinge rod 114. The isolators 118a and 118b account for installation variations of this rear mounting arrangement. In the preferred embodiment, the top right panel 211 and the top left panel 212 of the butterfly hood 209 have additional vertical support. This vertical support is provided by a "V" notch support bracket 125 on both the left side of the cowl 113 and the right side of the cowl 113. Both the top left panel 212 and the top right panel 211 have internal structural members 224. Engaged to the internal structural members 224 of the top left panel 212 and the top right panel 211 are mating hood support brackets 126. The mating hood support brackets 126 may be 'U' shaped with a short side 127 and a long side 128. The long side 128 is engaged to an internal structural member 224. The short side 127 will rest in the "V" notch support brackets 125 engaged to the cowl 113 when the butterfly hood 209 is closed. In one embodiment, each of the mating hood support brackets 126 has a wear block 129 to prevent metal-to-metal contact between the mating hood support brackets 126 and the "V" notch support brackets 125.

As the vehicle 101 is driven over a rough road surface, the cab air suspension system 110 allows the cab 106 to move, not only right to left, but also fore-and-aft relative to the length of the vehicle 101. The center hinge rod 114 of the butterfly hood 209 remains fixed to the radiator 105 and hence the chassis 102 via the front rod support 115. In the rear of the butterfly hood 209, the center hinge rod 114 moves fore-and-aft within the hinge rod support 117. The elongated length of the center hinge rod 114 and the forward displacement of the front cowl support 122 allow this movement of the butterfly hood 209 relative to the cab 106 without the butterfly hood 209 falling in upon the engine 104.

As described above, the butterfly hood mount system 10 of the present invention, the vehicle 101 with the butterfly hood mount system 10 installed provides a number of advantages, some of which have been described above, and others of which are inherent in the invention. Also modifications may be proposed to the butterfly hood 10 and the vehicle 101 with the butterfly hood mount system 10 installed without departing from the teachings. Accordingly, the scope of this invention is only to be limited as necessitated the accompanying claims.

We claim:

1. A butterfly hood mount system for a truck vehicle with a chassis with two frame rails, an engine engaged to the chassis, a radiator to cool the engine and engaged to the chassis, a cab engaged to the chassis through a cab air suspension system to allow the cab to move fore-and aft independently of the chassis, comprising:

(a) a butterfly hood comprised of a top right panel, a right side panel, a top left panel, and a left side panel;
   (b) a center hinge rod is engaged between said top right panel and said top left panel to allow opening of said butterfly hood;
   (c) said right side panel is hinge connected to said top right panel;
   (d) said left panel is hinge connected to said top left panel;
   (e) said center hinge rod having a front end portion extending forwardly beyond said top right panel and said top left panel, said front end portion being engaged to a chassis engaged component and secured thereto to prevent fore-and-aft movement of said center hinge rod relative to said chassis engaged component;
   (f) said center hinge rod engaged to a hinge rod support engageable to a cowl of the cab to allow fore-and-aft movement of the cab relative to said center hinge rod; and
   (g) wherein said center hinge rod to cowl engagement is more specifically comprised of:
      (i) said hinge rod having a rear end portion extending rearwardly beyond said top right panel and said top left panel, said rear end portion being engaged to said hinge rod support;
      (ii) said hinge rod support having a center hole through which said rear end portion of said center hinge rod penetrates and is slidably supported therein;
      (iii) said hinge rod support engaged to said cowl; and
      (iv) said hinge rod support displaced forward of the cowl to allow fore-and-aft movement of the cab relative to said center hinge rod.

2. The butterfly hood mount system of claim 3, wherein:
   (a) said chassis engaged component is the radiator of the vehicle.

3. The butterfly hood mount system of claim 3, wherein said hinge rod support to cowl engagement is more specifically comprised of:
   (a) said hinge rod support engaged to a support bracket, said support bracket being engaged to said cowl;
   (b) a first isolator between said hinge rod support and said support bracket;
   (c) a second isolator engaged on a side of said support bracket opposite said hinge rod support; and
   (d) fasteners holding said hinge rod support, said first isolator, said support bracket, and said second isolator together.

4. The butterfly hood mount system of claim 3, wherein said support bracket to cowl engagement is more specifically comprised of:
   (a) said support bracket being engaged to said cowl through a front cowl support and a back cowl support and cowl fasteners.

5. The butterfly hood mount system of claim 4, wherein:
   (a) said hinge rod support provides lateral support to and prevents vertical movement of said center hinge rod.

6. The butterfly hood mount system of claim 5, wherein:
   (a) a "V" notch support is engaged to both a left side and a right side of the cowl to provide vertical support to said top left panel and said top right panel; and
   (b) said top left panel and said top right panel each having a mating hood support bracket with a short side to engage said "V" notch supports when said butterfly hood is closed.

7. The butterfly hood mount system of claim 6, wherein said mating hood support brackets have wear blocks to eliminate metal to metal contact between said mating hood support brackets and said 'V' notch supports.

8. The butterfly hood mount system of claim 6, wherein said center hinge rod to radiator engagement is more specifically comprised of:
   (a) a front rod support engaged to the radiator;
   (b) said front rod support having a front through hole which said center hinge rod passes; and
   (c) a fastener set engaged to said center hinge rod to prevent fore-and-aft movement of said center hinge rod relative to the radiator.

9. The butterfly hood mount system of claim 8, wherein:
   (a) said fastener set includes a snap ring to engage around said center hinge rod where said center hinge rod passes through said front through hole of said front rod support; and
   (b) a spring engaged around an outer side of said center hinge rod between said snap ring and said front rod support.

10. The butterfly hood mount system of claim 1, wherein:
    (a) said center hole of said hinge rod support is through a bronze bushing contained within said hinge rod support.

11. A mobile vehicle, comprising:
    (a) a chassis with two frame rails;
    (b) a radiator engaged to said chassis;
    (c) a cab engaged to said chassis through a cab air suspension system to allow said cab to move fore-and-aft independently of said chassis;
    (d) a butterfly hood comprised of a top right panel, a right side panel, a top left panel, and a left side panel;
    (e) a center hinge rod is engaged between said top right panel and said top left panel to allow opening of said butterfly hood;
    (f) said right side panel is hinge connected to said top right panel;
    (g) said left side panel is hinge connected to said top left panel;
    (h) said center hinge rod having a front end portion extending forwardly beyond said top right panel and said top left panel, said front end portion being engaged to a chassis engaged component and secured thereto to prevent fore-and-aft movement of said center hinge rod relative to said chassis engaged component;

(i) said center hinge rod engaged to a hinge rod support engaged to a cowl of the cab to allow fore-and-aft movement of the cab relative to said center hinge rod; and (j) wherein said center hinge rod to cowl engagement is more specifically comprised of:
  (i) said hinge rod having a rear end portion extending rearwardly beyond said top right panel and said top left panel, said rear end portion being engaged to said hinge rod support;
  (ii) said hinge rod support having a center hole through which said rear end portion of said center hinge rod penetrates and is slidably supported therein;
  (iii) said hinge rod support displaced forward of said cowl;
  (iv) said hinge rod support engaged to a support bracket, said support bracket being engaged to said cowl;
  (v) a first rubber isolator between said hinge rod support and said support bracket;
  (vi) a second rubber isolator engaged on a side of said support bracket opposite said hinge rod support; and
  (vii) fasteners holding said hinge rod support, said first isolator, said support bracket, and said second isolator together.

12. The vehicle of claim 11, wherein:
(a) said chassis engaged component is said radiator.

13. The vehicle of claim 11, wherein:
(a) said hinge rod support provides lateral support to and prevents vertical movement of said center hinge rod.

14. The vehicle of claim 13, wherein:
(a) a "V" notch support is engaged to both a left side and a right side of said cowl to provide vertical support to said top left panel and said top right panel; and
(b) said top left panel and said top right panel each having a mating hood support bracket with a short side to to engage said "V" notch supports when said butterfly hood is closed.

15. The vehicle of claim 14, wherein said mating hood support brackets have wear blocks engaged to said short side to eliminate metal to metal contact between said mating hood support brackets and said 'V' notch supports.

16. The vehicle of claim 15, wherein said center hinge rod to radiator engagement is more specifically comprised of:
(a) a front rod support engaged to said radiator;
(b) said front rod support having a front through hole which said center hinge rod passes; and
(c) a fastener set engaged to said center hinge rod to prevent fore-and-aft movement of said center hinge rod relative to said radiator.

17. The vehicle of claim 16, wherein:
(a) said fastener set includes a snap ring to engage around said center hinge rod where said center hinge rod passes through said front through hole of said front rod support; and
(b) a spring engaged around and outer side of said center hinge rob between said snap ring and said front rod support.

18. The vehicle of claim 11, wherein:
(a) said center hole of said hinge rod support is through a bronze bushing contained within said hinge rod support.

* * * * *